Jan. 10, 1950

H. KELLER 2,494,246

GENERATION OF GRID VOLTAGES
FOR THE GRIDS OF CONVERTERS
Filed March 20, 1946

Fig. 2a.                    Fig. 2b.

INVENTOR
HANS KELLER
By Pierce + Scheffler,
Attorneys.

Patented Jan. 10, 1950

2,494,246

UNITED STATES PATENT OFFICE 2,494,246

GENERATION OF GRID VOLTAGES FOR THE GRIDS OF CONVERTERS

Hans Keller, Wettingen, Switzerland, assignor to Aktiengesellschaft Brown, Boveri & Cie, Baden, Switzerland Application March 20, 1946, Serial No. 655,690
In Switzerland March 28, 1945

3 Claims. (Cl. 315—352)

Figure 1A:
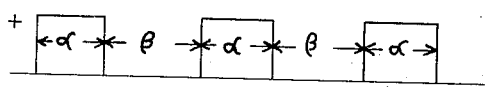
Figure 1B:
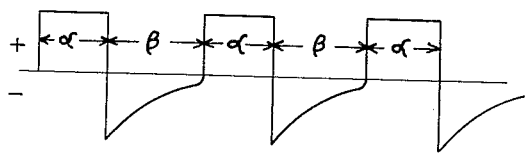

When single-anode convertors are employed for the transformation of alternating current into direct current or vice versa or of alternating current into one of another frequency, the convertors must be provided with control grids, to which ignition and blocking pulses are supplied. Should voltages higher than that obtainable directly from the current source be required for the control grid, the control pulses can no longer be supplied directly to the grids, but only indirectly through control transformers. Owing to the high voltage such transformers have relatively high losses, so that it has been found expedient to utilize a high frequency voltage oscillator, pass the oscillator output through a step-up, high-frequency transformer to obtain the voltage value required and then rectify the output of the high frequency transformer. If the rectified direct current pulses be transmitted directly to the control grid of the convertor, not only is it necessary to provide a separate negative source of blocking voltage for the grid, but there is the disadvantage that, on an excess voltage occurring at the control grid, the generator of the high frequency impulses will be destroyed. For ensuring the safety of the operation and of the insulation an intermediate transformer is used between the rectifier of the high frequency pulses and the control grid. This has the advantage, that a source of negative voltage is unnecessary. If the intermediate transformer be supplied on the primary side with a pulsating direct voltage from the rectifier for the high voltage pulses from the high frequency, step-up transformer, as in Figure 1a, the magnetising current will, while the pulse lasts, increase in accordance with the applied voltage and the course of the secondary voltage will in the same time be exactly like that of the primary voltage. In the intervals between the positive pulses α, i. e. during the period β in which the anode-cathode circuit of the convertor is blocked, the magnetic field in the iron will decrease in accordance with the time constant discharge resistance: inductance $$\left(\frac{R}{L}\right)$$

that is to say, the voltage will at first increase steeply and will then decrease slowly. See Figure 1b. This decrease will be the more rapid, the greater the value of R. A voltage, in which the positive and negative half waves have a course similar to that shown in Figure 1b is undesirable, as the negative control pulse decreases during the blocking period β of the convertor.

The invention relates to an arrangement for the generation of control voltages for the grids of convertors, with a peak value which remains constant during the entire blocking period of the grid, intermediate transformers being employed, more particularly for single-anode convertors, in which arrangement according to the invention the intermediate transformer is connected to the convertor in such a way that the primary power input to such transformer from the high frequency transformer, and the secondary power output therefrom are staggered in time relation to each other so that the magnetic energy built up in the secondary winding by the positive pulses applied to the primary during the period in which the convertor is blocked flows to the control grid of the convertor as positive pulses during the period in which the anode-cathode circuit of the convertor is to be conductive.

Or to state the invention in a somewhat different manner, the negative voltage used for blocking the anode-cathode circuit of the convertor during the non-conductive period of the convertor is obtained during the period in which positive pulses are applied to the intermediate transformer, and this negative blocking voltage has the desired rectangular shape so as to remain at a uniform value during the entire period in which the convertor is to be blocked because of the fact that the applied positive pulses likewise have a rectangular shape. At the end of each of the applied pulses, the magnetic flux built up in the intermediate transformer collapses and this induces a voltage of opposite (positive) polarity in the secondary which is used for igniting the convertor.

Figure 2:
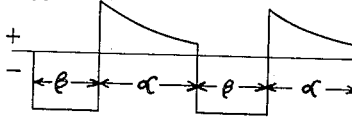
Figure 2:
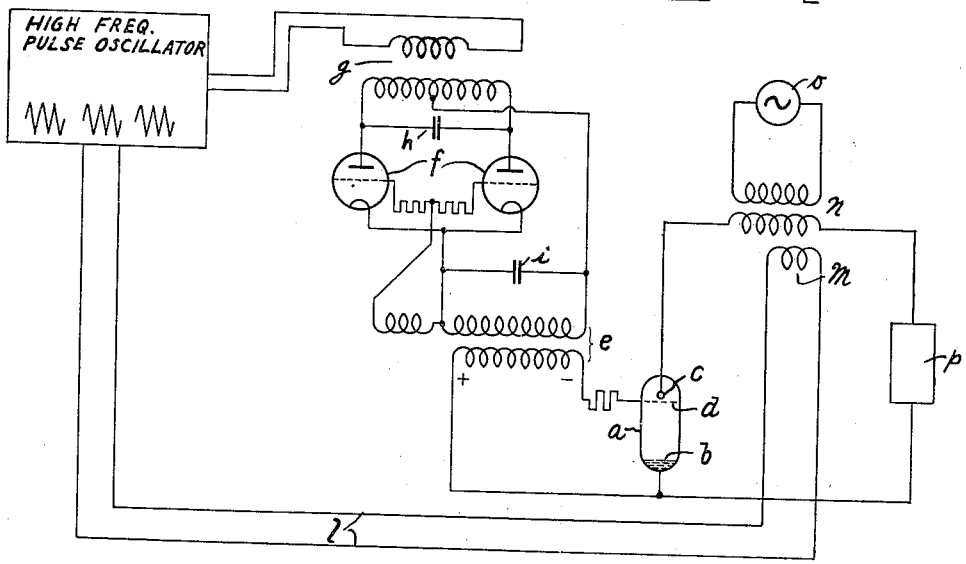

In the accompanying drawing a constructional example of the invention is shown diagrammatically in Figure 2, whilst Figures 2a, 2b show the generated grid control voltage.

In Figure 2a is a single-anode convertor with the mercury cathode b, the anode c and the grid d. The grid d is connected to cathode b through the secondary winding of an intermediate transformer e, the grid d being connected to that terminal at which a "negative" potential is established by rectified current in the primary of transformer e. The rectifier system is of conventional full-wave rectification type including two triodes f having a tuned input circuit comprising the secondary winding of a high frequency transformer g and a condenser h. Grid voltage for the rectifiers f is developed in an auxiliary winding of transformer e. A condenser i is shunted across the primary of the transformer $e$ to smooth out the rectified current pulses.

The primary winding of the transformer $g$ is energized from a high frequency, low-voltage oscillator $k$, and the constants of the secondary winding of transformer $g$ and of its condenser $h$ are such that the high frequency transformer is tuned to the frequency of the oscillator $k$. The output of the oscillator $k$ takes the form of high frequency pulses, i. e. bundles of high frequency waves which have a very steep wave front. The pulses are synchronized with the power current through leads $l$ and an auxiliary winding $m$ of the power transformer $n$. The primary winding of transformer $n$ is energized from an alternating current power source $o$, and the secondary winding is connected, in series with the direct current load $p$, between the anode $a$ and cathode $b$ of the convertor $a$.

It will now be evident that for each pulse of high frequency alternating voltage emitted from oscillator $k$, the current through the primary of transformer $e$ will, because of the action of rectifiers $f$, be substantially unidirectional in character. The result of this as reflected in the secondary of transformer $e$ is a rectangular voltage pulse that is applied to the grid $d$ of the convertor as a negative pulse. See Fig. 2a. The oscillator $k$ is synchronized with the main power circuit so that each negative pulse applied to the control grid $d$ starts exactly at the beginning of the period during which the convertor is to be blocked and terminates exactly at the end of such period.

At the end of each negative grid pulse, the magnetic field built up in the transformer $e$ will reverse itself resulting in a voltage pulse of positive polarity. The leading edge of this positive voltage pulse establishes conduction through the convertor and, when once initiated, such conduction continues throughout that half-cycle of the power current or until blocked by a negative voltage applied to grid $d$.

The arrangement according to the invention provides the advantage, that the negative pulse retains a constant peak value over the whole of the blocking period, that is to say, the negative voltage half wave is completely rectangle-shaped while the shape of the positive, sloping pulse of the control voltage will depend upon the amplitude reached by the leading edge of the positive pulse at the instant that ignition takes place between the grid $d$ and cathode $b$. Normally ignition will take place when the positive pulse reaches the amplitude shown in Fig. 2a. Should, however, the tube fail to ignite at this value of voltage, ignition will nevertheless be assured. In such event the resistance between grid $d$ and cathode $b$ becomes very high, i. e. the ratio of R to L of transformer $e$ becomes higher; the peak of the positive voltage pulse will no longer be that as shown in Fig. 2a but on the contrary will rise very much higher such as shown in Fig. 2b, under which condition ignition is certain to take place.

The power pulse supplied to the intermediate transformer on the primary side may consist of several rectified part pulses. The primary power pulse supplied to the intermediate transformer may also continue longer than the power pulse taken from it on the secondary side.

I claim:

1. In an electric discharge device of the type including anode and cathode elements and a grid therebetween to which ignition and blocking voltage pulses are applied, means for producing said pulses, said pulse producing means comprising, means generating spaced high frequency voltage pulses having a steep wave front, the duration of said pulses and the spacing therebetween being synchronized respectively with the blocking and ignition periods of the discharge device, rectifier means converting said pulses to substantially rectangular pulses, a transformer, connections between the primary of said transformer and the output of said rectifier means, and circuit means connecting the secondary of said transformer across the grid and cathode elements of said discharge device to thereby supply to the grid correspondingly spaced and shaped negative blocking pulses during the periods in which the rectified pulses are applied to the primary of said transformer, and positive ignition pulses between such periods.

2. An arrangement for supplying grid pulses as defined in claim 1 wherein the negative blocking pulse at the output of said transformer is of longer duration than the positive ignition pulse.

3. In an electric discharge device of the type including anode and cathode elements and a grid therebetween to which ignition and blocking voltage pulses are applied, means for producing said pulses, said pulse producing means comprising, means including an oscillator for producing spaced pulses of high frequency voltage, the duration of said pulses and the spacing therebetween being synchronized respectively with the blocking and ignition periods of the discharge device, a step-up transformer to which said pulses are applied, rectifier means connected to the output of said transformer for converting said pulses to correspondingly spaced and substantially rectangular wave pulses, a second transformer to the primary of which said spaced rectangular wave pulses are applied, and means connecting the secondary of said second transformer in circuit between the grid and cathode elements of said discharge device to thereby supply to the grid corespondingly spaced and shaped negative blocking pulses during the periods in which the pulses are applied to the primary of said second transformer, and positive ignition pulses between such periods.

HANS KELLER.

REFERENCES CITED

The following references are of record in the file of this patent:

UNITED STATES PATENTS

| Number | Name | Date |
|---|---|---|
| 1,257,978 | Chubb | Mar. 5, 1918 |
| 2,104,463 | Johnson et al. | Jan. 4, 1938 |
| 2,205,221 | Seethaler | June 18, 1940 |
| 2,248,600 | Alexanderson et al. | July 8, 1941 |